Nov. 23, 1954  R. STOLL  2,694,879
INSECT TRAP AND EXTERMINATOR

Filed Dec. 17, 1951  2 Sheets-Sheet 1

Richard Stoll
INVENTOR.

BY *Clarence A. O'Brien*
*and Harvey B. Jacobson*
Attorneys

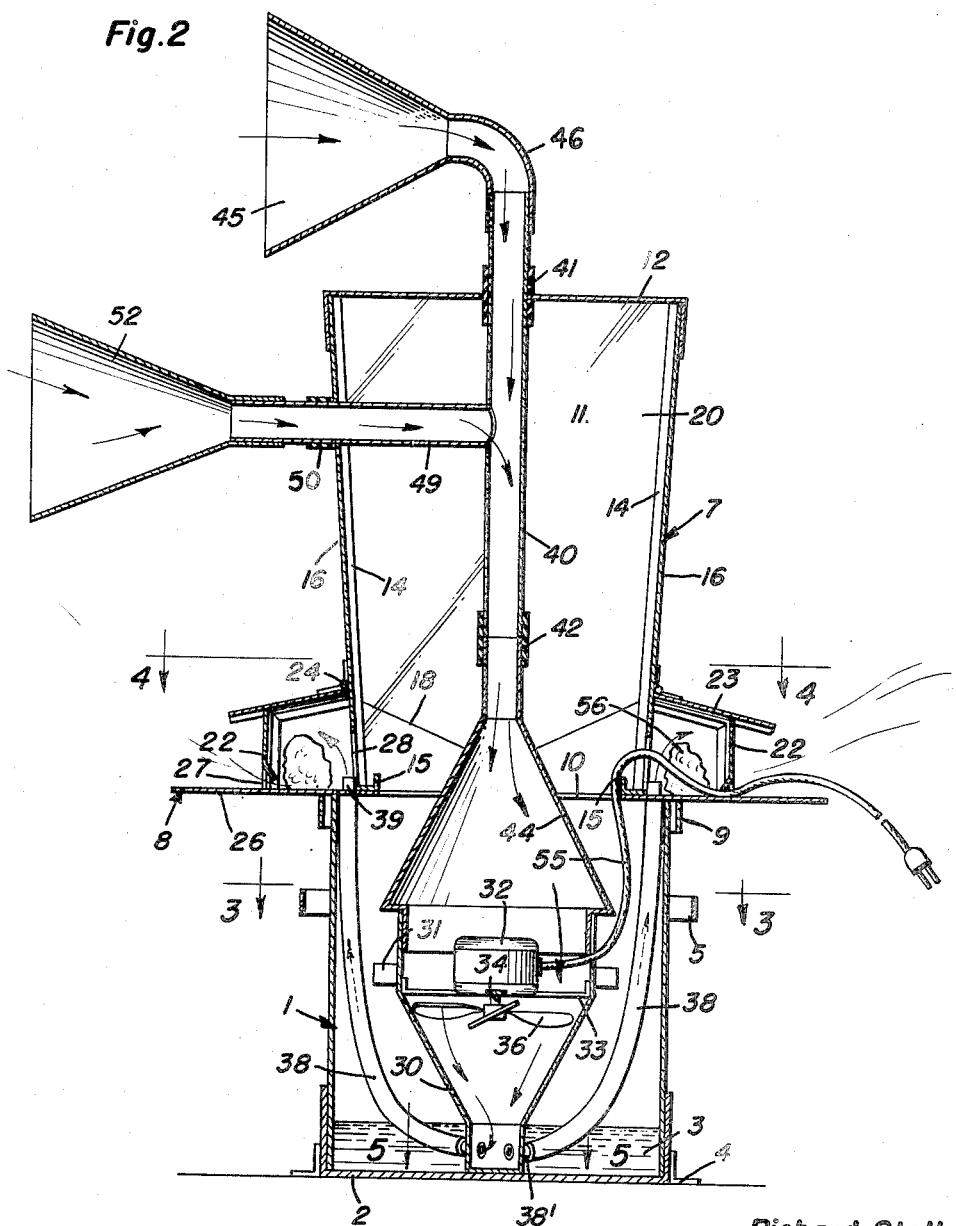

United States Patent Office 2,694,879
Patented Nov. 23, 1954

2,694,879

INSECT TRAP AND EXTERMINATOR

Richard Stoll, Awendaw, S. C.

Application December 17, 1951, Serial No. 262,056

4 Claims. (Cl. 43—122)

My invention relates to improvements in insect traps and exterminators especially designed for exterminating screw worm flies on cattle ranges.

The primary object of my invention is to provide a trap for catching and exterminating such flies constructed to attract the flies from a long distance on a cattle range by the scent of bait such as tainted meat upon which the flies feed.

Still another object is to provide a trap which is rendered highly efficient for the above purposes by disseminating the odor of tainted meat for a considerable distance from the trap through air currents blown over the tainted meat and out of the trap.

Still another object is to provide a trap for the above purposes which is inexpensive to construct, install and operate and which may be readily taken apart for storage purposes.

Other and subordinate objects, within the purview of my invention, together with the precise nature of my improvements will be readily understood when the succeeding description and claims are read with reference to the drawings accompanying and forming part of the specification.

In said drawings:

Figure 2 is a view in vertical section taken on the line 2—2 of Figure 1 and drawn to a larger scale;

Figure 1:
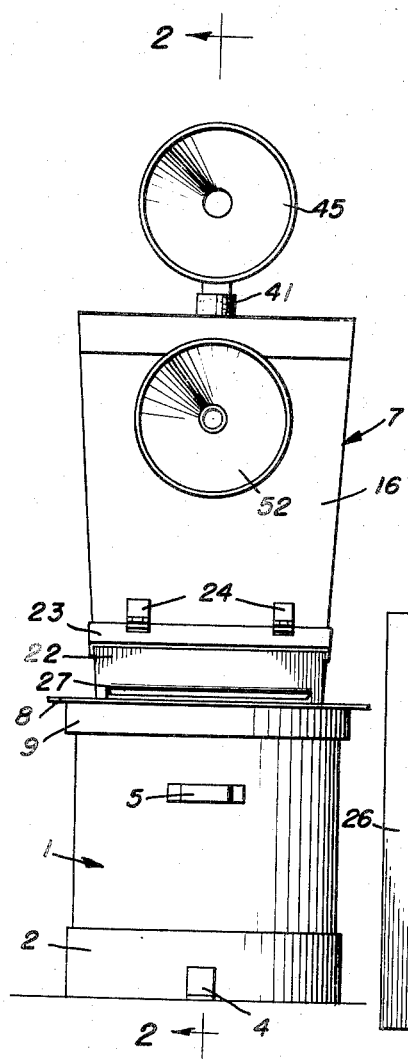
Figure 1 is a view in side elevation of my improved trap in the preferred embodiment thereof.
Figure 3:
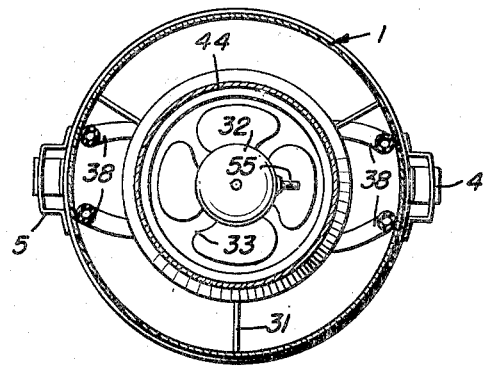
Figure 3 is a view in horizontal section taken on the line 3—3 of Figure 2.
Figure 4:
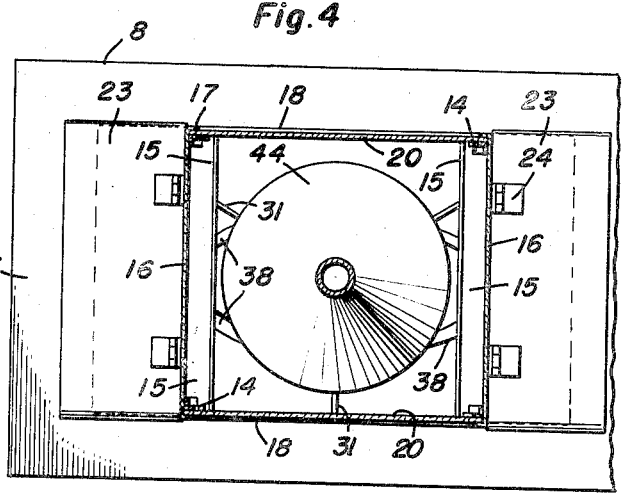
Figure 4 is a view in transverse section taken on the line 4—4 of Figure 2.
Figure 5:
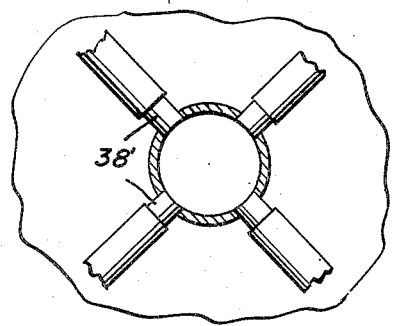
Figure 5 is a fragmentary view in horizontal section taken on the line 5—5 of Figure 2 and drawn to a larger scale.

Referring to the drawings by numerals, my improved trap, as illustrated, comprises a tubular sheet metal bottom section 1 fitted at its lower end in a circular base pan 2 adapted to rest on the ground. The lower end of the bottom section 1 is removably fitted in the pan 2 but forms a liquid tight seal preventing liquid leakage of the limited amount of water and oil 3 introduced into the bottom of said section 1 for a purpose to be presently explained. Lateral ground engaging stabilizing lugs 4 are provided on the side of the pan 2 and diametrically opposite handles 5 are provided on the bottom section 1 for lifting said section out of the pan 2.

An upper section 7 is supported on top of the bottom section 1. The upper section 7 comprises an oblong, rectangular bottom plate 8 of sheet metal removably seated on the upper end of the bottom section 1 and centered thereon by a depending annular, central flange 9 encircling said upper end of the section 1. The bottom plate 8 overhangs the upper end of said section 1 and is provided with a square, central opening 10 of reduced size as compared with the diameter of the bottom section 1. The upper section 7 further includes an upright fly confining chamber 11 of square cross section rising above the bottom plate 8 around the opening 10 and in axial alignment with the bottom section 1, and which is closed at its upper end by a flanged cap 12. The bottom of the chamber 11 is smaller than the top of the bottom section 1 to offset the former inwardly of the top of the bottom section 1 for a purpose to be presently seen.

The fly confining chamber 11 comprises upright corner bars 14 suitably secured at their lower ends thereof on a pair of transverse sheet metal bars 15 suitably fixed on top of the bottom plate 8 at opposite sides of the opening 10 and to which a pair of upright sheet metal panels 16 closing opposite sides of said chamber 11 are secured, as by welding, not shown, said panels 16 having vertical edge flanges 17. At the other sides of said chamber 11, a pair of upright, longitudinal flanges 18 on the bottom plate 8 extend along opposite sides of the opening 10. A pair of glass panels 20 close said other sides of said chamber 11 and are fitted between the flanges 17 and the upright bars 14 at corresponding sides of said chamber 11 with the lower ends of said panels 20 fitted against the flanges 18.

A pair of elongated bait boxes 22 extend transversely over the bottom plate 8 at the lower end of and outside the fly confining chamber 11 at the first mentioned sides of said chamber 11 and which are closed at the ends thereof by the aforementioned flanges 18 with the bottom plate 8 forming the bottoms of said boxes and the panels 16 forming the backs of said boxes. The bait boxes 22 are closed by top sheet metal lids 23 hinged, as at 24, to the panels 16 for opening upwardly to permit bait to be inserted in said boxes. The ends of the bottom plate 8 form alighting ledges 26 for the flies in front of the bait boxes 22, and front bottom slots 27 in said boxes 22 provide entrances for the flies entering said boxes. Openings 28 in the backs of the boxes 22, which is to say in the panels 16, provide entrances for the flies passing from the bait boxes 22 into the fly confining chamber 11.

Means is provided for blowing atmospheric air outwardly through the bait boxes 22 over tainted meat therein to disseminate the odor from the meat outwardly of said boxes. For this purpose a funnel-shaped motor and fan casing 30 with a closed lower end is provided to rest in the pan 2 in the water and oil 3 therein. Radial arms 31 on the casing 30 engaging the inner side surface of the bottom section 1 maintain said casing 30 upright and coaxial with the bottom section 1.

An electric motor 32 is supported in the casing 30 by a spider 33 and with the armature shaft 34 in depending position and provided with a suction and blower fan 36 thereon. As will be obvious, the casing 30 is removable with the motor 32 and fan 36 upwardly out of the bottom section 1.

Flexible air discharge pipes 38 detachably secured at lower ends thereof over air discharge nipples 38' extending radially from the lower end of the casing 30 are provided for discharging air into the bait boxes 22. The pipes 38 extend upwardly in pairs to the bottom plate 8 of the upper section 7 to discharge nipples 39 in the bottoms and rear portions of the bait boxes 22.

An air intake pipe 40 extends downwardly through a center sleeve 41 in the cap 12 and into the chamber 11 and is detachably connected at its lower ends by a coupling 42 to an inverted funnel-shaped closure section 44 for the casing 30 and is removably fitted downwardly in the top of said casing 30. An air intake funnel 45 is detachably and rotatably sleeved, by a goose-neck section 46, onto the upper end of said pipe 40 above the cap 12 to extend laterally from said pipe so that rain will not enter the same and said pipe 40. A branch air intake pipe 49 extends laterally from said pipe 40 out of the fly confining chamber 11 through a sleeve 50 on one of the panels 16 and is equipped outside said chamber 11 with an intake funnel 52 sleeved thereon.

An electric plug in cable 55 extends from the motor 32 out of the casing 30 and through one of the bait boxes 22 for connection to a suitable source, not shown, of electricity.

The operation and use of the invention will be readily understood. Tainted meat 56 is placed in the bait boxes 22. With the motor 32 running, atmospheric air is drawn by the fan 36 into the casing 30 by way of the air intake funnels 45, 52, pipes 40, 49 and the closure section 44, as indicated by the arrows in Figure 2, and is blown by said fan as indicated by the arrows in said figure into the bait boxes 22 over the meat 56 and out of the entrance slots 27 to be disseminated outside the trap and spread the odor from the meat outwardly of the trap The flies attracted by the odor enter the bait boxes 22 by way of said slots 27 and find their way through the openings 28 into the fly confining chamber 11 from which the flies will find their way through the opening 10 in the bottom section 1 and fall into the oil and water 3 and be exterminated therein. The motor 32 is designed to be operated at slow speed by any conventional control, not shown, so that the fan 36 will be operated at slow speed and the odor laden air will issue out of the slots 27 slowly, at such a low velocity, that it will not impede the passage of flies over the plates 8 and into the slots 27. By lifting the bottom section 1 by the handles 5 the pan 2 may be detached for emptying of dead flies and refilling with liquid and oil. As will be seen, the upper section 7 comprising the described chamber 11, bottom plate 8 and bait boxes 22 may be lifted off the bottom section 1 together with the described pipes 40, 49, funnels 45, 52, and the closure section 44 pulled out of the casing 30 to partly disassemble the trap, after which the funnels 45, 52 and the closure section 44 may be pulled off the associated pipes to completely disassemble the parts of the trap. Of course, in lifting the upper section 7 as described, the flexible pipes 38 will be pulled loose from the nipples 39 in the bait boxes 22 to which the same may be reconnected preparatory to replacing the section 7 on the section 1. The bait boxes 22 may be reloaded with meat 56 by merely opening the lid 23.

The foregoing will, it is believed, suffice to impart a clear understanding of my invention, without further explanation.

Manifestly, the invention as described, is susceptible of modification, without departing from the inventive concept, and right is herein reserved to such modifications as fall within the scope of the appended claims.

Having described the invention, what is claimed as new is:

1. A trap and exterminator for screw worm flies comprising an upright tubular bottom section closed at its bottom to contain an insect destroying liquid and open at its top, an upper insect confining section seated and centered on the upper end of said bottom section and including a chamber closed at its top and opening into said bottom section, whereby insects confined in said chamber may find their way into the bottom section and into the liquid therein, said chamber having a pair of bait receiving boxes, the boxes being on opposite sides thereof and having front entrance slots for the insects and openings at the rear thereof into said chamber for passage of the insects from said boxes into said chamber, and means in the bottom section for blowing air into said boxes over the bait to discharge out of said slots and disseminate odors from the bait into the air to attract the insects to said bait.

2. A trap and exterminator according to claim 1, said means comprising a casing in said bottom section, a fan operative in said casing to compress air therein, and pipes communicating said casing with said boxes.

3. A trap and exterminator according to claim 2 including devices communicating said casing with the atmospheric air to supply the casing with fresh air.

4. A trap and exterminator according to claim 3 wherein said devices comprise a pipe extending from said casing upwardly through and above said chamber and provided above said chamber with a flaring inlet end.

References Cited in the file of this patent

UNITED STATES PATENTS

| Number | Name | Date |
|--------|------|------|
| 959,155 | Nault | May 24, 1910 |
| 993,644 | Brisbane | May 30, 1911 |
| 2,478,104 | Johnson | Aug. 2, 1949 |